United States Patent [19]

Mourad et al.

[11] Patent Number: 6,078,961
[45] Date of Patent: Jun. 20, 2000

[54] METHOD FOR REAL-TIME DELIVERY OF MULTIMEDIA INFORMATION REQUIRING A VERY HIGH BANDWIDTH PATH OVER THE INTERNET

[75] Inventors: Magda Mahmoud Mourad, Yorktown Heights; Ahmed Nasr-El-Din Tantawy, Yorktown Hgts., both of N.Y.

[73] Assignee: International Business Machines Corporation, Armonk, N.Y.

[21] Appl. No.: 09/007,683

[22] Filed: Jan. 15, 1998

[51] Int. Cl.$^7$ .................................................. G06F 13/00
[52] U.S. Cl. ........................................................ 709/235
[58] Field of Search .................. 364/DIG. 1, DIG. 2; 709/200, 201, 202, 203, 204, 217, 218, 219, 227, 228, 231, 232, 233, 235, 238, 239

[56] References Cited

U.S. PATENT DOCUMENTS 5,852,721  12/1998  Dillon et al. .............................. 709/217

*Primary Examiner*—Robert B. Harrell
*Attorney, Agent, or Firm*—Scully, Scott, Murphy & Presser; Douglas W. Cameron, Esq.

[57] ABSTRACT

In an Internet environment, more specifically in a World Wide Web (WWW) environment, the disclosed architecture and method allow a user to receive multimedia information consisting of a very large amount of data from a multimedia server over a high bandwidth data path. The high bandwidth data path could possibly be a cable TV network or a satellite downlink which the user is sharing with other users on a demand-assignment basis. The user interacts in a regular fashion with all other WWW servers and controls the multimedia server over a regular Internet connection, possibly via a modem or a local area network. No change to the standard WWW protocols is required to implement this method.

12 Claims, 3 Drawing Sheets

METHOD FOR REAL-TIME DELIVERY OF MULTIMEDIA INFORMATION REQUIRING A VERY HIGH BANDWIDTH PATH OVER THE INTERNET

BACKGROUND OF THE INVENTION

1. Technical Field

The present invention relates generally to a method for real-time delivery of multimedia information requiring a very high bandwidth path over the Internet. More particularly, the subject invention pertains to an architecture and method which allow a client and a multimedia server to communicate over the Internet using current standard Internet protocols, but with the enhancement of enabling the server to use a high bandwidth shared link to transfer large multimedia files which require such an expensive link in order to ensure real time delivery and display of multimedia information at the client end.

2. Prior Art

In the World Wide Web (WWW) environment, a set of protocols are used to allow a user to locate specific pieces of information (also referred to as web pages) and request their transmission to his workstation and their display on his screen in a window through a web browser.

Every piece of information (web page or file) is uniquely identified by a Universal Resource Locator (URL) which has four main parts:

1) the Internet address of the machine hosting the information (also known as the IP address of that machine),
2) the port where the web server software process can be found (the port number usually defaults to number 80),
3) the name of the directory where the page resides on the machine, and
4) the name and type of the file containing the information.

A simple protocol is used during communications between the user and the www server as described below. This protocol is often referred to as the Hyper Text Transfer Protocol (HTTP) and runs over the Transmission Control Protocol (TCP) and the Internet Protocol (IP), which are the standard protocols of the Internet. This procedure is described hereinbelow with reference to FIG. 1.

It should be clear from the above that the model of communication used in the Internet and the WWW is that the client and the server use a single full duplex link to exchange data as well as commands and responses necessary to exchange the actual data.

In all cases, the information is transmitted to the client at a data rate which cannot exceed the bandwidth of the full duplex link between the server and the client. Typically this is limited to a range from a few kilobits per second to a few megabits per second. In most cases, clients are not directly connected to web servers over a high bandwidth link but rather communicate across a connection spanning several different links interconnected by interworking gateways of various types such as routers, bridges and switches. Consequently, it is usually impossible to guarantee continuous streaming of data over such a concatenation of links and switches or routers. This turns out to be truly problematic if the data to be streamed demands stringent delay and jitter requirements, which is the case of video and audio streams.

The current solution to this problem is to require the client device to first receive the multimedia information and store it in its local disk, and then play it back to the user from that local storage, thus eliminating the effect of jitter from the network.

This approach has at least two main disadvantages.

1) The client device has to dedicate storage space to buffer the received multimedia information before it can start to play it to the user. This space may be significant at times. This also implies that client devices must have large local storage resources in order for them to be able to handle incoming multimedia traffic. Network computers and other low cost communication devices generally do not provide such resources.
2) The fact that multimedia information has to be stored, even temporarily, in the client device poses some real concerns among the copyright owners of this information, who would like to see their material delivered exclusively to those users who cannot physically store it and subsequently have the possibility to reuse or redistribute it in an illegal manner.

U.S. Pat. No. 5,321,542 to Freitas, et al. and U.S. Pat. No. 5,448,759 to Krebs, et al. disclose the concept of using two or more channels to transmit data between two systems. The present invention describes a similar idea but with an architecture and method to implement it in the Internet communication network using current standard Internet and WWW communication protocols which do not normally allow this type of communication between two communicating entities on the Internet.

SUMMARY OF THE INVENTION

Accordingly, it is a primary object of the present invention to provide a method for real-time delivery of multimedia information requiring a very high bandwidth path over the Internet.

The present invention provides a method which allows a client and a multimedia server to communicate over the Internet using current standard Internet protocols, but with the enhancement of enabling the server to use a high bandwidth shared link to transfer large multimedia files which require such an expensive link in order to ensure real time delivery and display of multimedia information at the client end.

In normal situations, the client and the web servers would use a regular full duplex link, such as a modem connection or a local area network to communicate and exchange information as prescribed by the Internet communication model and protocols.

When a multimedia file is to be played back at the user screen without necessarily downloading it, then the server will allocate the necessary bandwidth on a high bandwidth simplex link, such as a cable television channel or a satellite downlink channel, and use this allocated bandwidth to transfer the multimedia file to the client at a data rate which makes it possible for the client to receive and play back the multimedia information in real time, without having to download it first to a disk storage for buffering as mentioned hereinabove.

BRIEF DESCRIPTION OF THE DRAWINGS

The foregoing objects and advantages of the present invention for a method for real-time delivery of multimedia information requiring a very high bandwidth path over the Internet may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

When the World Wide Web (WWW) is used on the Internet to retrieve and view information, all requests and responses, which often contain the requested data, are sent over the same link. In the architecture and method pursuant to the present invention, large volumes of multimedia data are allowed to be routed selectively through a different link which has a higher bandwidth than the regular Internet link. This can be easily applied to home or business users who can connect to the Internet via a cable TV network or via a satellite downlink, both of which are becoming increasingly popular and reasonably economical.

The present invention provides an architecture and a method which provides two receive paths for receiving data from a network in response to requests made on a single transmit path, one receive path being used for regular (low bandwidth) data streams and the second receive path being used for high bandwidth multimedia streams.

Figure 1:
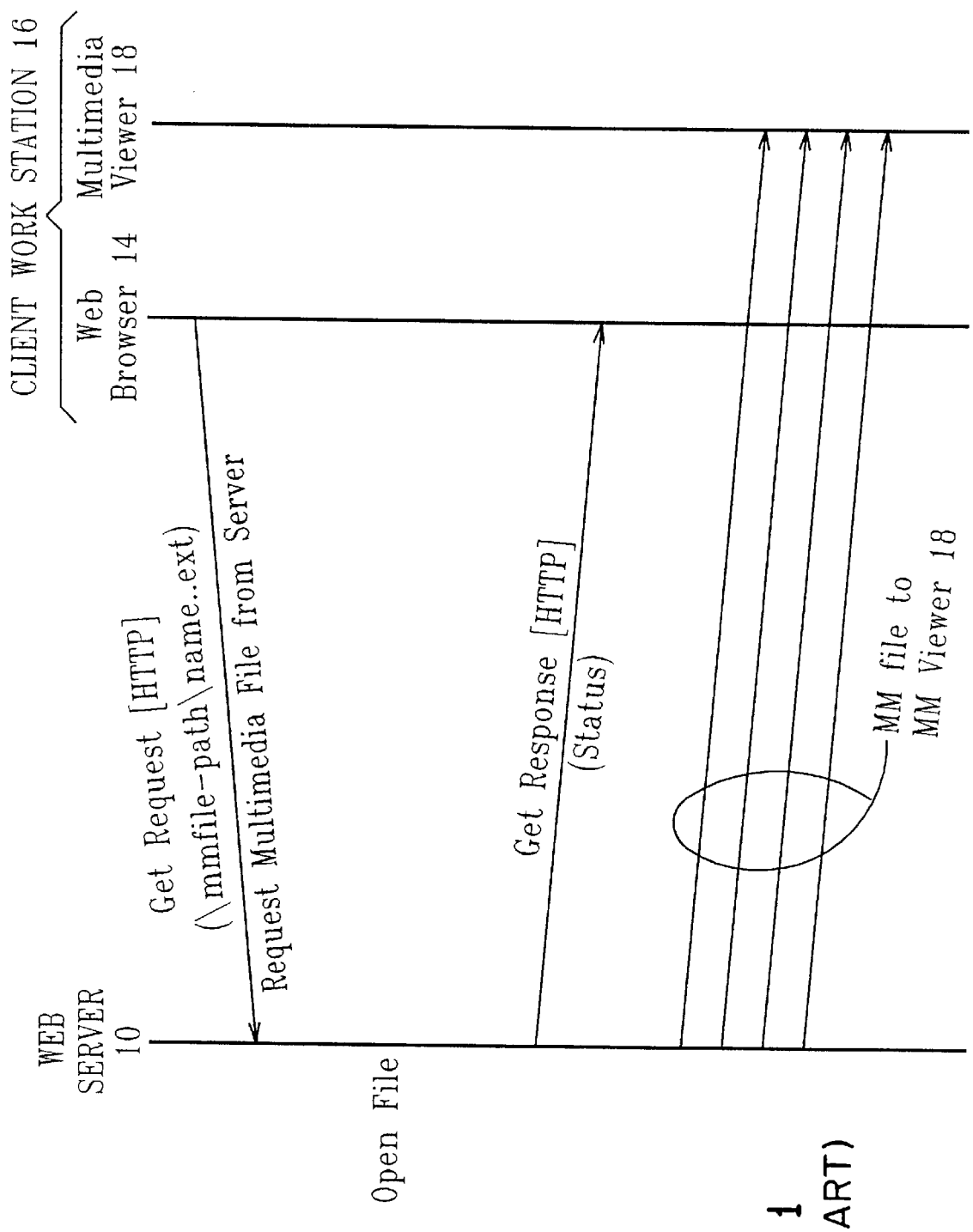
FIG. 1 illustrates typical steps involving regular multimedia information browsing over the Internet.
Figure 2:
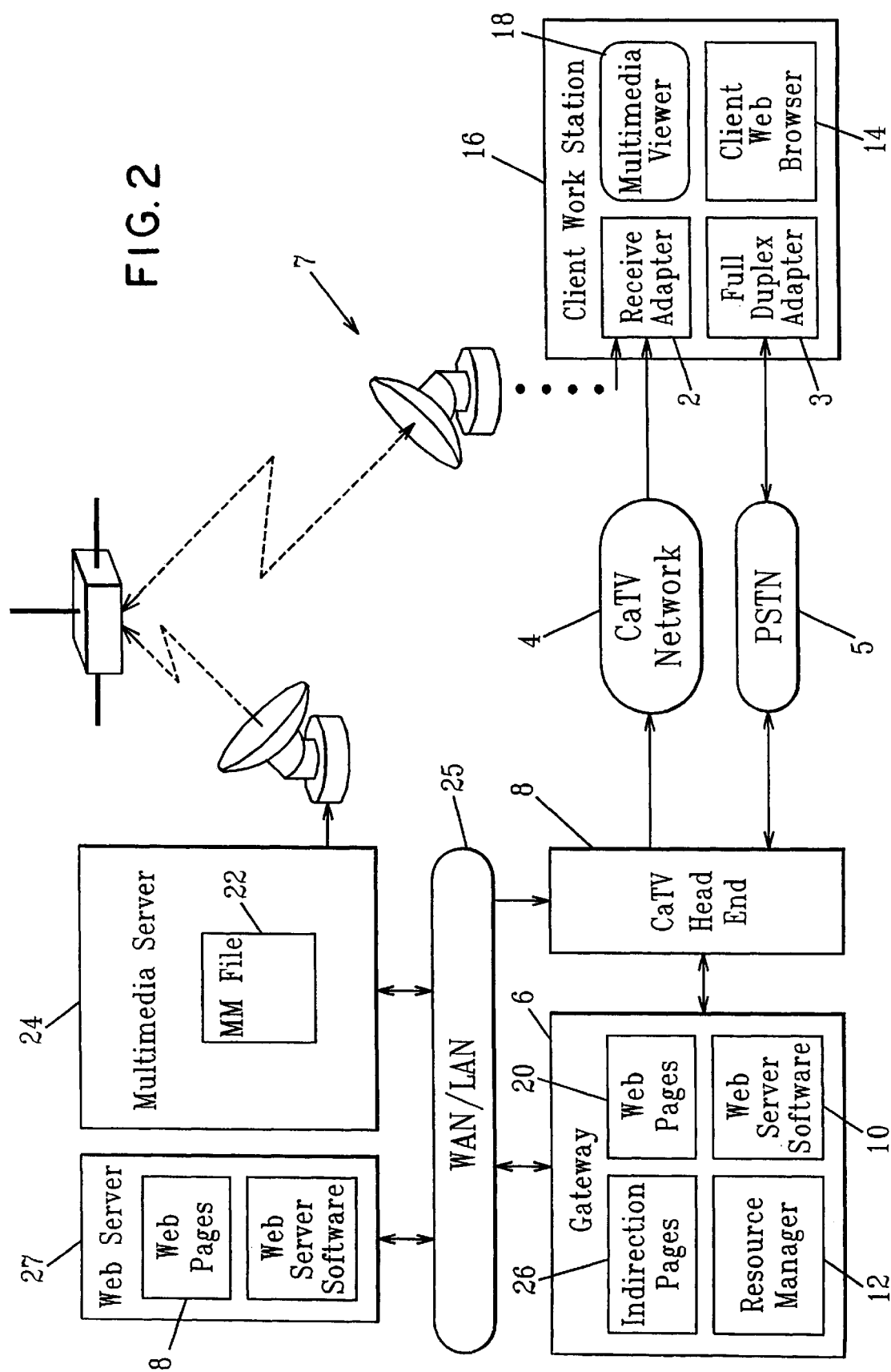
FIG. 2 illustrates a preferred embodiment of the architecture of the present invention.

FIGS. 1 and 2 illustrate typical steps involving regular multimedia information browsing over the Internet. A client work station 16 uses a client web browser 14 and full duplex adapter 3 to issue a request for information which is transmitted over the PSTN (Public Switch Telephone Network) 5 to the gateway 6 and multimedia server 24 regarding a requested multimedia file 22. A wide or local area network 25 can interconnect the gateway 6, a web server 27 and the multimedia server 24. The multimedia server 24 then transmits the multimedia data through gateway 6 and the PSTN 5 to the multimedia viewer 18 at the client work station 16.

Referring to FIG. 2, the architecture of the present invention comprises:

- a receive-only communication adapter card (2) to a satellite receiver (7) or a cable TV network (4). The following explanation focuses on the cable TV network, but a similar approach can be applied to the case of a satellite downlink data broadcast channel;
- a web browser (14) (e.g., Netscape Navigatorm, a commercially available product of Netscape Communications Corp.) running on the client workstation (16);
- multimedia viewing application software (18) running on the client workstation (16) and implementing the method described hereinbelow;
- a full duplex communication adapter (3) attached to a full duplex link, such as the Public Switch Telephone Network (PSTN) (5);
- a gateway (6) residing. at the cable TV head end (8);
- regular web server software (10) running in the gateway (6) similar to the way it runs on any regular web server (27);
- resource manager software (12) as described hereinbelow, also running in the gateway (6).

Figure 3:
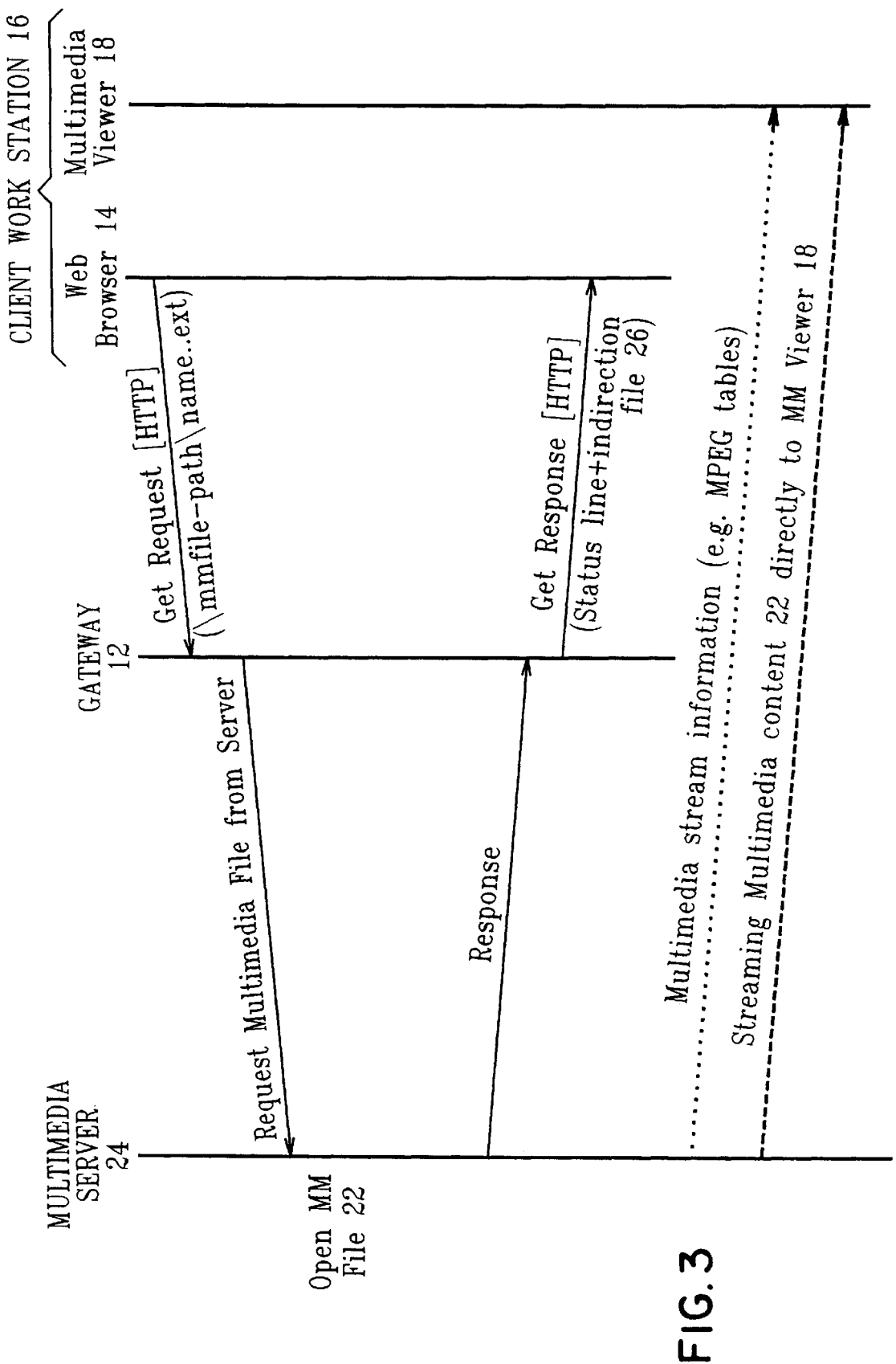
FIG. 3 illustrates typical steps involving the regular transmission of multimedia information over the Internet pursuant to the present invention.

A preferred method of implementing the present invention is illustrated in FIGS. 2 and 3.

The HTML (Hyper Text Markup Language) menu files are created as usually practiced on the Internet for all types of information except large multimedia files. These HTML menu files are among the local web pages (20) and contain pointers to the actual information, residing either locally at (20) or remotely at (23), through the ports leading to the classical web server software (10).

The HTML menu files for large multimedia files also reside locally in (20) but identify the actual multimedia information as being reachable through the port leading to the resource manager (12) although they actually reside in other servers (24).

The HTML menu files are sent to the client web browser (14) and are displayed for the user to select the information the user wants to retrieve.

When a user clicks on a file name, a get command is issued by the web browser (14) to bring that file from the server identified by the URL (Universal Resource Locator as described hereinabove), i.e., (20) or (23) for regular information and an indirection file (26) for multimedia information.

Therefore, the multimedia file would appear to reside in (26) but, in fact, the small indirection file (26) resides in its place and provides an indirection that implements the present invention as follows.

When a multimedia file get request reaches the resource manager (12), data from the small indirection file (26) is sent to the client's browser (14), containing the communications port on which the user workstation (16) will be receiving data on the large multimedia file. This port information would typically include a cable TV channel number, an MPEG-2 (Moving Picture Experts Group, ISO/IEC 13818) transport stream program identification number multiplexed on that TV channel, etc. The small indirection file (26) has a special suffix that identifies it so that the web browser (14) can store it and invoke the multimedia viewing application software (18) as specified by the user in the initialization file of the web browser (14).

The multimedia server (24) transmits the multimedia information (22) through the CaTV headend (8) and over the high bandwidth CaTV Network (4) to the client through the receive-only adapter (2).

In one embodiment, as the multimedia information is being transmitted over the high bandwidth channel, the low bandwidth full duplex channel could be utilized by the client to control the transmission and/or playback of the multimedia information, such as to pause, stop, rewind, fast forward, etc., the display of the multimedia information, similar to the manner in which a VCR is controlled.

When the large multimedia file is delivered or when the user terminates the application, control is given from the viewer back to the browser.

FIG. 3 illustrates typical steps involving multimedia information communication over the Internet pursuant to the present invention. A client work station 16 uses a client web browser 14 and full duplex adapter 3 to issue a request for information, on a multimedia file 22 which request is transmitted over the PSTN 5 to the gateway 6 and multimedia server 24. The multimedia server 24 then transmits the multimedia data through WAN/LAN 25, cable TV head end 8, cable TV network 4, and receive only adapter card 2 to the multimedia viewer 18 at the client work station 16.

While several embodiments and variations of the present invention for a method for real-time delivery of multimedia information requiring a very high bandwidth path over the Internet are described in detail herein, it should be apparent that the disclosure and teachings of the present invention will suggest many alternative designs to those skilled in the art.

Having thus described our invention, what we claim as new, and desire to secure by Letters Patent is:

1. A method for transmitting data between a client and a server over an Internet communication network, the method comprising:

providing a first low bandwidth full duplex channel and a second high bandwidth channel for transmitting data between the client and the server;

exchanging requests and responses to requests to retrieve and view information over the first low bandwidth full duplex channel;

transmitting from the server to the client a file, in response to a request from the client; and the server selecting one of the first and second channels over which to transmit the file to the client, wherein the server selects to transfer a file requiring a greater bandwidth than that of the full duplex channel, over the second high bandwidth channel.

2. A method as claimed in claim 1, wherein the file transmitted over the second high bandwidth channel is received through a receive-only communication adaptor circuit at a client work station.

3. A method as claimed in claim 2, wherein the client work station further utilizes a web browser, multimedia viewing application software, and a full duplex communication adapter coupled to the full duplex channel.

4. A method as claimed in claim 3, wherein a gateway at the second channel head end uses web server software associated with web pages, and resource manager software.

5. A method as claimed in claim 4, wherein hyper text markup language (HTML) menu files are stored in the web pages.

6. A method as claimed in claim 5, wherein the HTML menu files are transmitted to the client work station web browser over the full duplex channel and are displayed for the user to select the information the user wants to retrieve.

7. A method as claimed in claim 6, wherein a get command is issued by the web browser to bring a particular file from a web server, and in response thereto data from an indirection file is transmitted to the client work station web browser containing a communications port on which the user workstation will be receiving data on the particular file.

8. A method as claimed in claim 7, wherein the particular file is a large multimedia file, and the indirection file has a suffix which identifies it so that the client work station web browser can store it and invoke multimedia viewing application software as specified by the user in an initialization file of the client work station web browser.

9. A method as claimed in claim 8, wherein a multimedia server transmits the multimedia information over the second high bandwidth channel to the client work station through the receive-only communication adapter circuit.

10. A method as claimed in claim 1, wherein the second high bandwidth channel comprises a cable television channel.

11. A method as claimed in claim 1, wherein the second high bandwidth channel comprises a satellite downlink channel.

12. A method as claimed in claim 1, wherein as the file is being transmitted over the second high bandwidth channel, the low bandwidth full duplex channel is utilized to control the transmission and/or playback of the file.

* * * * *